United States Patent [19]
Mattern

[11] Patent Number: 5,868,174
[45] Date of Patent: Feb. 9, 1999

[54] SYSTEM FOR ACCESSING AND EXTRACTING CONTENTS FROM A CONTAINER WITHIN A SEALABLE RECOVERY VESSEL

[75] Inventor: Charles C. Mattern, Clermont, Fla.

[73] Assignee: Earth Resources Corporation, Ocoee, Fla.

[21] Appl. No.: 901,528

[22] Filed: Jul. 28, 1997

[51] Int. Cl.$^6$ .................................................. B65B 31/00
[52] U.S. Cl. ............................................. 141/51; 141/65
[58] Field of Search ........................... 141/51, 97, 98, 141/329, 65, 91, 93; 222/87; 408/72 R

[56] References Cited

U.S. PATENT DOCUMENTS

| | | |
|---|---|---|
| Re. 33,799 | 1/1992 | Gold et al. . |
| 45,183 | 11/1864 | Sexton . |
| 314,085 | 3/1885 | Van Norman . |
| 381,950 | 5/1888 | Pratt . |
| 572,786 | 12/1896 | Downey . |
| 1,167,178 | 1/1916 | Hill . |
| 1,806,270 | 5/1931 | Thompson . |
| 2,101,762 | 12/1937 | Straub ........................................ 124/11 |
| 2,338,583 | 1/1944 | Hickman et al. ............................ 230/2 |
| 2,488,157 | 11/1949 | Bassano ..................................... 62/115 |
| 2,911,859 | 11/1959 | Longley et al. ............................. 77/42 |
| 2,985,050 | 5/1961 | Schwacha .................................. 83/53 |
| 3,091,052 | 5/1963 | Ryan ............................................ 46/7 |
| 3,364,939 | 1/1968 | Valenziano ................................ 137/15 |
| 3,394,905 | 7/1968 | Rapp ....................................... 244/3.23 |
| 3,422,808 | 1/1969 | Stein et al. ................................. 124/11 |
| 3,428,037 | 2/1969 | Capriolo et al. .......................... 124/11 |
| 3,481,529 | 12/1969 | Mugele ....................................... 230/45 |
| 3,495,615 | 2/1970 | Ehrens et al. . |
| 3,719,028 | 3/1973 | Brooks . |
| 3,746,256 | 7/1973 | Hall et al. ................................. 239/101 |
| 3,821,965 | 7/1974 | Reynolds . |
| 3,870,474 | 3/1975 | Houston .................................... 23/277 |
| 3,926,135 | 12/1975 | De Gregorio ............................ 141/74 |

(List continued on next page.)

FOREIGN PATENT DOCUMENTS

| | | |
|---|---|---|
| 950614 | 10/1956 | Germany . |
| 2 120 761 | 12/1983 | United Kingdom . |
| PCT/US93/ 04099 | 5/1993 | WIPO . |
| PCT/US94/ 04797 | 4/1994 | WIPO . |

OTHER PUBLICATIONS

Committee On Alternative Chemical Demilitarization Technologies et al., "Alternative Technologies For The Destruction Of Chemical Agents And Munitions," National Academy Press, 1993, pp. 1–21.

American Petroleum Institute, "Procedures For Welding Or Hot Tapping On Equipment Containing Flammables," API Publication 2201, Third Edition, Oct. 1985.

Earth Resources Corporation, "Comprehensive Management of Compressed Gases.".

Earth Resources Corporation, "Statement of Qualifications – Compressed Gas Management Services," 1993.

Earth Resources Corporation, "Providing The Total Solution To Compressed Gas Problems With a Commitment To Safety & Quality," 1993.

E.I. DuPont de Nemours & Co., "Krytox Severe Service Lubricants for Industrial, Automotive, Aerospace and Electronic Applications," Technical Marketing Company, Inc.

(List continued on next page.)

*Primary Examiner*—J. Casimer Jacyna
*Assistant Examiner*—Kerry S. Culpepper
*Attorney, Agent, or Firm*—Hunton & Williams

[57] ABSTRACT

An access and extraction assembly for use in accessing contents of a container within a sealable recovery vessel. Interchangeable seal cup adapters are provided to improved the effectiveness of seal between the assembly and various shapes and sizes of containers. An extendible segment of the access portion can extend beyond an access tool to permit reagents, solvents or similar materials to be sprayed inside the container after it has been accessed.

13 Claims, 4 Drawing Sheets

U.S. PATENT DOCUMENTS

| | | | |
|---|---|---|---|
| 3,929,411 | 12/1975 | Takano et al. | 141/54 |
| 3,974,846 | 8/1976 | Serota | 137/15 |
| 3,983,756 | 10/1976 | Danguillier et al. | 73/432 |
| 3,995,655 | 12/1976 | Sands | 137/318 |
| 4,038,032 | 7/1977 | Brewer et al. | 23/230 |
| 4,046,055 | 9/1977 | McDanolds et al. | 83/177 |
| 4,110,929 | 9/1978 | Weigand | 417/68 |
| 4,112,797 | 9/1978 | Pearl | 422/22 |
| 4,132,504 | 1/1979 | Fitch . | |
| 4,160,806 | 7/1979 | Long et al. . | |
| 4,168,243 | 9/1979 | Gablin et al. | 252/301 |
| 4,169,403 | 10/1979 | Hanson . | |
| 4,208,383 | 6/1980 | Kisters et al. . | |
| 4,255,168 | 3/1981 | Nguyen . | |
| 4,312,254 | 1/1982 | Pearl . | |
| 4,350,052 | 9/1982 | Kendall . | |
| 4,399,829 | 8/1983 | Schuler . | |
| 4,411,846 | 10/1983 | Ulrich et al. . | |
| 4,421,037 | 12/1983 | Leam . | |
| 4,475,566 | 10/1984 | Haines . | |
| 4,620,466 | 11/1986 | Jumel et al. . | |
| 4,665,827 | 5/1987 | Ellis, II . | |
| 4,679,987 | 7/1987 | Olsen . | |
| 4,718,834 | 1/1988 | Ebner et al. . | |
| 4,734,108 | 3/1988 | Cox et al. . | |
| 4,762,467 | 8/1988 | Ackermann et al. . | |
| 4,792,284 | 12/1988 | Straub et al. . | |
| 4,795,315 | 1/1989 | Schultze . | |
| 4,874,587 | 10/1989 | Galloway . | |
| 4,875,420 | 10/1989 | Hay et al. . | |
| 4,881,517 | 11/1989 | Wackrow et al. . | |
| 4,966,317 | 10/1990 | Barr . | |
| 5,017,047 | 5/1991 | Myles et al. . | |
| 5,025,730 | 6/1991 | Petrovich . | |
| 5,030,039 | 7/1991 | Dove . | |
| 5,055,003 | 10/1991 | Svensson . | |
| 5,134,921 | 8/1992 | Breed et al. . | |
| 5,150,909 | 9/1992 | Fitzwater . | |
| 5,163,462 | 11/1992 | Leemput et al. . | |
| 5,163,483 | 11/1992 | Eckman . | |
| 5,163,585 | 11/1992 | Campbell . | |
| 5,197,863 | 3/1993 | Dardis et al. . | |
| 5,210,368 | 5/1993 | Heller, Jr. et al. . | |
| 5,230,324 | 7/1993 | Van Horssen et al. . | |
| 5,265,762 | 11/1993 | Campbell et al. . | |
| 5,275,214 | 1/1994 | Rehberger . | |
| 5,279,646 | 1/1994 | Schwab . | |
| 5,303,749 | 4/1994 | Stock et al. . | |
| 5,325,787 | 7/1994 | Boual . | |
| 5,337,793 | 8/1994 | Gold et al. . | |
| 5,339,876 | 8/1994 | Mattern . | |
| 5,340,244 | 8/1994 | Hawley et al. . | |
| 5,365,913 | 11/1994 | Walton . | |
| 5,383,498 | 1/1995 | Mattern et al. . | |
| 5,383,499 | 1/1995 | Mattern . | |
| 5,427,157 | 6/1995 | Nickens et al. . | |
| 5,460,154 | 10/1995 | Mattern et al. . | |
| 5,474,114 | 12/1995 | Nickens et al. . | |
| 5,499,665 | 3/1996 | Gold et al. . | |
| 5,507,604 | 4/1996 | Hawley et al. . | |
| 5,584,325 | 12/1996 | Nickens et al. . | |
| 5,613,533 | 3/1997 | Gold et al. . | |
| 5,618,157 | 4/1997 | Hawley et al. . | |
| 5,636,666 | 6/1997 | Mattern . | |
| 5,664,610 | 9/1997 | Nickens et al. . | |
| 5,715,803 | 2/1998 | Mattern . | |

OTHER PUBLICATIONS

E.I. DuPont de Nemours & Co., Krytox Vacuum Pump Fluids.

E.I. DuPont de Nemours & Co., "Krytox LVP High–Vacuum Grease Performs Dependably –No Matter What Conditions Your System Operates Under.".

E.I. DuPont de Nemours & Co., "Vacuum Pump Fluids.".

Generic Specifications For the Treatment of CWM, Section 7.3, U.S. Army Manual, pp. 7–15 through 7–19.

State of Florida, Agency for Health Care Administration, "Minutes Of The Joint Committee Meeting With The Community Health Purchasing Alliance (CBPA) Data Advisory Committee And The Comprehensive Health Related Information System (CHFIS) Advisory Council," Aug., 1993.

"Destruction Agency Generic Site Scoping Study," U.S. Army Chemical Material, Dec. 3, 1993.

"Shock Test Squeezes Core Temperature," *Science,* vol. 267, Mar. 17, 1995.

Browne, M., "Big Gun Makes Hydrogen Into A Metal," *The New York Times,* Mar. 26, 1996.

SYSTEM FOR ACCESSING AND EXTRACTING CONTENTS FROM A CONTAINER WITHIN A SEALABLE RECOVERY VESSEL

FIELD OF THE INVENTION

This invention relates to a system for accessing and extracting contents from a container within a sealable recovery vessel.

BACKGROUND

Various types of sealed containers are well known. Such containers are commonly used to contain toxic, unstable, reactive, unknown or other potentially hazardous materials. For simplicity, these materials will be generally referred to as hazardous materials.

Sealed containers include both valved containers and non-valved containers. Valved containers are generally accessed by actuation of the valve or valves integrally associated with the container. Valve actuation generally involves rotation of a valve from a closed position to an open position. Valve actuation provides access to the contents of the valved container, for example, by venting the material from the container. Manual actuation of valves containers can be dangerous or otherwise undesired under certain circumstances. This is especially so with containers housing hazardous materials.

In some instances, attempted manual valve actuation may result in leakage, uncontrolled reactions, or other problems. Content containment is often not available for manual valve actuation. Content containment is particularly desirable where the container contents are unknown or hazardous.

In some cases manual valve actuation is not suitable. For example, valve actuation may not be effective for accessing container contents where the valve is defective or where the valve body is blocked (e.g., by corrosion products or polymerized materials). Some containers do not have valves. For such situations it may be necessary to access the contents through alternative mechanisms. One such alternative is using what is referred to as a Cylinder Rupture Vessel ("CRV"). For example, CRVs such as those described in U.S. Pat. No. Re. 33,799 entitled "Cylinder Rupture Vessel"; U.S. Pat. No. 4,944,333 entitled "Cylinder Rupture Vessel with Clamps for Immobilizing a Container Within the Vessel;" U.S. Pat. No. 5,186,219 entitled "Cylinder Rupture Vessel;" U.S. Pat. No. 5,339,876 entitled "Apparatus and Methods for Removing Hazardous Contents from Compressed Gas Cylinders;" U.S. Pat. No. 5,383,498 entitled "Cylinder Rupture Vessel with Cylinder Rotation Mechanism and Rupture Mechanism;" U.S. Pat. No. 5,383,499 entitled "System for Removal of Unknown, Corrosive, or Potentially Hazardous Gases From a Gas Container;" U.S. Pat. No. 5,427,157 entitled "Apparatus and Method for Controlled Penetration of Compressed Fluid Cylinders;" U.S. Pat. No. 5,474,114 entitled "Apparatus and Method for Controlled Penetration of Compressed Fluid Cylinders;" U.S. Pat. No. 5,499,665 entitled "Cylinder Rupture Vessel;" U.S. Pat. No. 5,584,325 entitled "Apparatus and Method for Controlled Penetration of Compressed Fluid Cylinders;" and U.S. Pat. No. 5,613,533 entitled "Cylinder Rupture Vessel;" enable access to the contents of containers (including, but not limited to cylinders with inoperable valves) in a controlled environment. Such containers may be cylinders, munitions, drums or other containers, containing either known or unknown substances. For simplicity, the term "container" will be used herein broadly to refer to cylinders, munitions, drums or other containers containing known or unknown substances (whether pressurized or not).

The general structure and operation of a sealable recovery vessel, such as a CRV, is described, for example, in the aforementioned patents which are incorporated herein by reference in their entirety. Briefly, a CRV generally comprises a sealed chamber with an access door for enabling a container to be located therein on a support surface. A sealing mechanism is provided to seal the chamber. Inlet and outlet ports may be provided for creating a vacuum and/or introducing inert gas into the CRV and for purging air and inert gas from the container to control the environment during processing of the container. In a CRV, an access mechanism is typically provided for gaining access to the inside of the container. Access can be obtained, for example, by rupturing a wall of the container using a rupture mechanism such as a punch, spike, drill, projectile or saw or by shearing the container near the valve to remove the valve. The term "rupture" is understood broadly to mean gaining access to the interior of the container by penetrating a wall or a portion of the container by these or other mechanisms. In some prior CRVs, the container is held stationary by chains or other securing mechanisms. It is also known to invert the container after rupturing to facilitate the removal of its contents, especially when those contents are liquids. Other functions and feature of CRVs are disclosed in the aforementioned patents.

Accessing the contents of a container by use of a CRV enables controlled access to the contents of the container. For example, the CRV may prevent leakage of the contents into the environment and may be designed to withstand explosions caused by accessing the contents should they occur in the CRV. The use of a CRV provides these and other safety advantages, especially where normal valve operation is not possible. However, the use of a CRV can be more costly than normal valve operation. Thus, existing systems leave the alternatives of deciding whether to use a cheaper, potentially unsafe approach to access a valved container or to use a safer but potentially more costly approach.

These and other drawbacks exist in heretofore known systems.

SUMMARY OF THE INVENTION

An object of the invention is to overcome these and other drawbacks of known systems and techniques.

Another object of the invention is to provide an improved system and method for accessing and extracting the contents of a container within a sealable recovery vessel.

Another object of the invention is to provide an improved system and method for accessing and extracting the contents of a container within a sealable recovery vessel where the extraction system is adaptable to form a seal with the surface of a variety of container shapes and sizes.

Another object of the invention is to provide an improved system and method for accessing and extracting the contents of a container within a sealable recovery vessel where the extraction system comprises an extendible segment (e.g., a spring loaded spray shaft) that can be extended beyond the end of a drill (or other access tool) when a container is penetrated.

Another object of the invention is to provide positive stops to control the amount of penetration of the access portion into the container.

Another object of the invention is to provide an extraction system that forms an enclosed conduit having an access port to facilitate the extraction of the container contents. In some embodiments the access port is connectable to processing, treatment or disinfecting facilities.

Another object of the invention is to provide the access portion of the extraction system with a rotatable union. The rotatable union provides an additional access port capable of introducing suitable substances inside the container while concurrently allowing the access portion to rotate. The suitable substances may comprise cleaning liquids, reagents, pressurized air or steam to facilitate the removal of residual contents and for cleaning/decontaminating the container after removal of the contents.

Another object of the invention is to provide a mechanism to access a container though an uppermost surface thereof and to extract the contents of the container through a tube which is lowered from an upper portion of the container to a lower portion of the container.

According to one preferred embodiment, a sealable recovery vessel is provided with at least one access mechanism that permits access to and withdrawal of contents from a container located in a sealable recovery vessel. The access mechanism may also be used to introduce cleaning liquids, reagents, steam or other material to facilitate the removal of residual liquids, solids and other container contents, and to clean/decontaminate the container after removal of the bulk of the contents thereof. The access mechanism may comprise a hollow shaft having a seal cup at the end thereof to enable a seal to be formed between the seal cup and the container. To accommodate different sized containers, an adapter may be provided to conveniently enable various sized and shaped seal cups to facilitate the seal with the container, based on characteristics (e.g., shape, diameter, etc.) of the container.

Additionally, the access mechanism may be provided with an extendible segment (e.g., a spring loaded spray shaft) that can be extended beyond the end of a drill (or other access tool) when a container is penetrated. The extendible segment can be used as a spray nozzle to facilitate the introduction of suitable substances inside the container.

In accordance with one embodiment of the present invention, the extraction assembly may be hydraulically, electrically or pneumatically powered inside of a sealable recovery vessel. Hydraulic or pneumatic pressure may be adjusted to prevent excessive torque application. Torque limiters may also be employed to prevent excessive torque application.

According to one embodiment of the present invention, a sealable recovery vessel is used to provide containment for accessing the contents of a container located therein. The contents of the container (e.g., hazardous material), may then be sampled for identification and safely removed in a manner which is protective of the environment. The pressure in the container can range up to 2000 psi or higher. Additionally, the material within the container may be in a gas phase, a liquid phase, or a combination of both a gas and liquid phase. Solids, powders, biological agents and other materials may also be present.

Typically, the container has been sealed either purposefully or inadvertently, and must be opened to access the contents. In some cases it is prudent to open it remotely due to the hazardous nature of the contents which may be air reactive, shock sensitive, extremely toxic, or otherwise hazardous. Federal safety regulations require that containers located at hazardous waste sites be opened behind a protective barrier to protect employees in the event of an accidental explosion (29 C.F.R. 1910.120 (j) (2)). Unlabeled containers must be assumed to contain hazardous substances and handled accordingly (29 C.F.R. 1910.120 (j) (1) (iv)). The present invention addresses these and other safety and environmental precautions and provides additional benefits.

In one embodiment of the present invention, the access mechanism(s) may comprise one or more of an upper and a lower access assembly. For example, these assemblies may be drilling assemblies or other structures for penetrating one or more wall portions of a container located inside of a sealable recovery vessel. The container may be supported on a support located within the sealable recovery vessel. A roller mechanism may be incorporated into the support to permit the container to be rotated along an axis thereof (e.g., a longitudinal axis). The upper and lower access assemblies may also allow removal of contents from the container and introduction of cleaning reagents and other materials into the container.

Other objects and advantages of the present invention will be apparent from the description of the preferred embodiments when read in conjunction with the drawings.

DETAILED DESCRIPTION OF THE PREFERRED EMBODIMENTS

Figure 1:
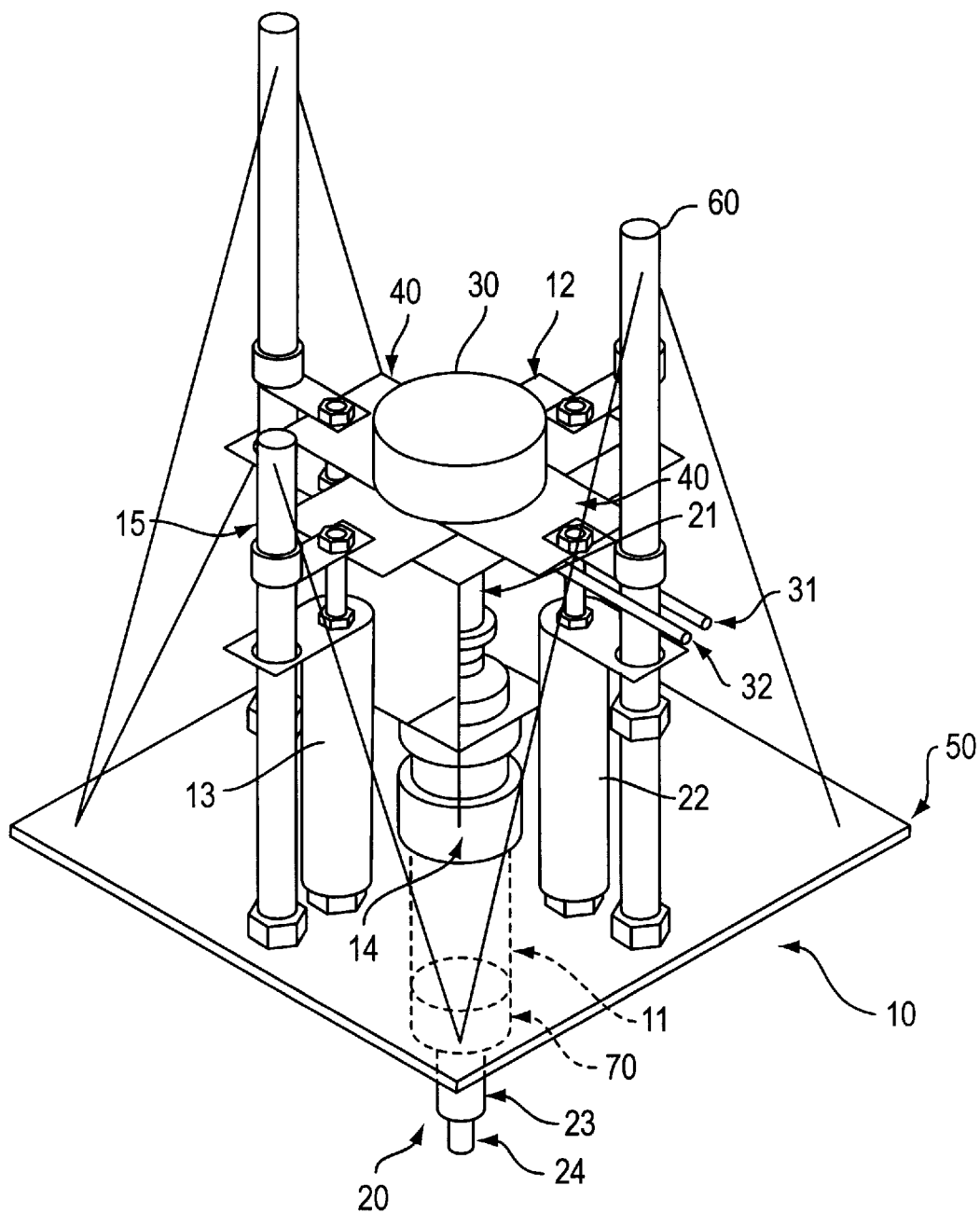
FIG. 1 is a schematic depiction of an assembly for accessing and extracting the contents of a container within a sealable recovery vessel.

Sealable recovery vessels per se are known as shown in the patents mentioned above which are incorporated herein by reference. FIG. 1 shows a schematic depiction of an assembly for accessing and extracting the contents of a container within a sealable recovery vessel. Such an assembly is operably connected to a sealable recovery vessel. Either an upper assembly a lower assembly or both an upper and lower assembly can be used. These units are preferably installed on a pressure vessel enclosing a container to be processed.

As depicted on FIG. 1, an access portion 20 of the assembly preferably comprises a shaft 21 attached to a motor 30 and an access shaft assembly 23. The upper portion of the shaft 21 attaches to a coupling connected to the motor 30. The motor 30 rotates the shaft 21 and shaft assembly 23. The motor 30 can be hydraulic, pneumatic, electric or any other type suitable for imparting rotary motion to the shaft 21. The embodiment shown in FIG. 1 depicts a motor 30 powered by hydraulic supply line 31 and return line 32. The motor 30 and attached drill shaft 21 are mounted on brackets 40. Two brackets 40 are shown, but any configuration of brackets sufficient to support the motor 30 and access portion 20 can be used. An attachment plate 50 is used to provide a sealed interface with the sealable recovery vessel.

Access shaft assembly 23 is mounted within an extraction tube 11. The shaft assembly 23 is connected to and is rotated along with the drill shaft 21. An access tool 24 is connected to the shaft assembly 23. The access tool may comprise a drill, a saw, a hole saw or other access tool to enable penetration of the wall of a container located within the sealable recovery vessel.

Two access cylinders 22 are attached, preferably by bolts, to the mounting brackets 40. The access cylinders 22 work in unison to move the entire access portion 20 vertically. The access cylinders 22 can be driven by hydraulic, pneumatic or other similar power sources. Two supporting guides 60 are provided for stability.

A seal cup adapter 70 is connected to an end of the extraction tube 11. The cup adapter 70 is interchangeable with other cup adapters (see FIGS. 4A–C). The adapter is selected according to the size and shape of the container to be accessed to maximize or increase the effectiveness of the seal between the seal cup and the container.

The extraction tube 11 is attached to two mounting brackets 12. The brackets are in turn attached to two extraction tube cylinder rams 13 and two extraction tube support guides 15. The cylinder rams work together to move the extraction tube 11. An o-ring (or a washer or other similar sealing device) within the extraction tube seal housing 14 forms a pressure tight seal between the extraction tube 11 and sealable recovery vessel. While two mounting brackets 12, cylinder rams 13 and support guides 15 have been shown in the embodiment depicted in FIG. 1, other configurations and numbers of these components may be used.

The extraction cylinders 12 and drill cylinders 22 can be operated independently. Thus, the extraction tube 11 and the access portion 20 can be positioned independent of one another as required.

Figure 2:
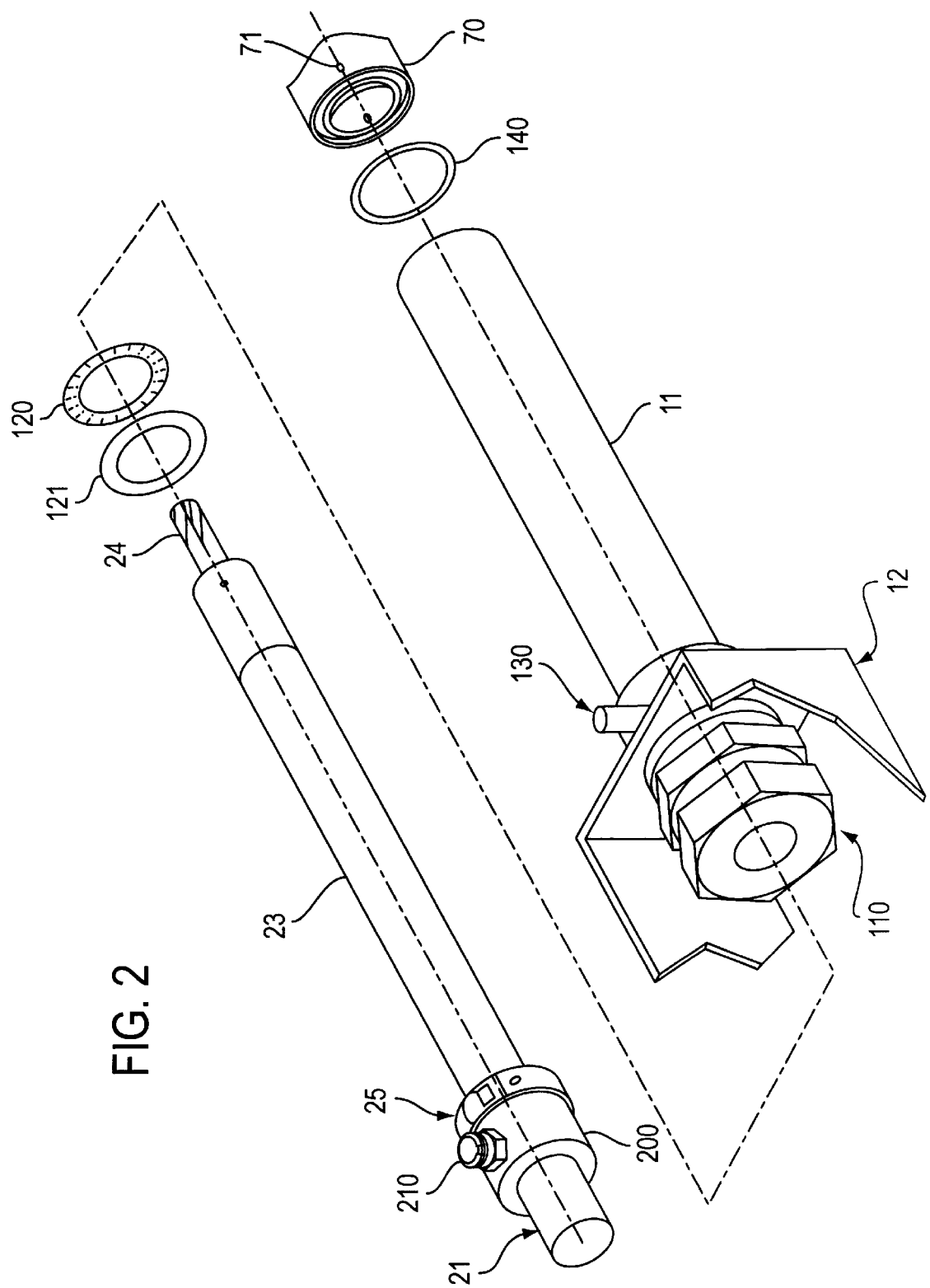
FIG. 2 is an exploded view of a portion of the assembly of FIG. 1.

FIG. 2 depicts an exploded view of a portion of the assembly of FIG. 1, including portions of the extraction tube 11 and access shaft assembly 23. The shaft 21 is connected to the shaft assembly 23 through a shaft collar 25. The shaft assembly 23 is inserted into the extraction tube 11 as shown. A pressure tight seal is made between the extraction tube assembly 11 and the shaft collar 23 at union 110. In the embodiment shown in FIG. 2, the union 110 comprises a rotatable union (e.g., a modified Swagelock™ union comprising Teflon™ ferules and flexible o-rings). Other types of pressure tight connectable seals may be used. A thrust bearing 120, with washers 121, may be installed between the upper portion of the union 110 and the shaft collar 25.

An extraction tube access port 130 is formed in the extraction tube assembly 11. The contents of a container can be withdrawn through the extraction tube 11 and out of the port 130. Preferably, extraction lines are connected to the port 130 and further connected to processing or treatment piping. Materials may also be introduced therethrough.

A seal cup adapter 70 is mated to the end of the extraction tube 11 to form a seal against the body of a container. The seal cup adapter 70 attaches to the extraction tube 11 and can be loosely fixed in position using two spring loaded ball plungers 71 mating with corresponding slots (not shown) on an inner quick release attachment configurations for the seal cup adapter 70, for example, threading, may be used. A seal is formed between the seal cup adapter 70 and the extraction tube 11 through the compression of the extraction tube end against an o-ring 140 installed in the upper portion of the cup adapter 70. Other types of seals, such as washers or gaskets, may be used.

Figure 4A:
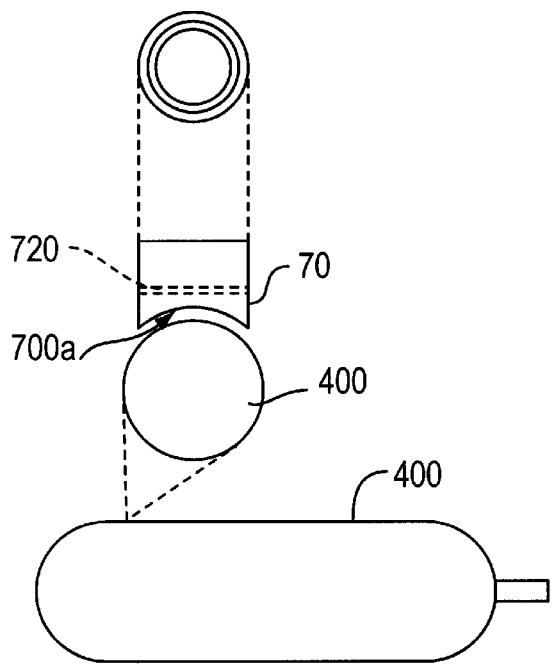
FIG. 4A depicts one configuration of an adapter end for use with the extraction system.
Figure 4B:
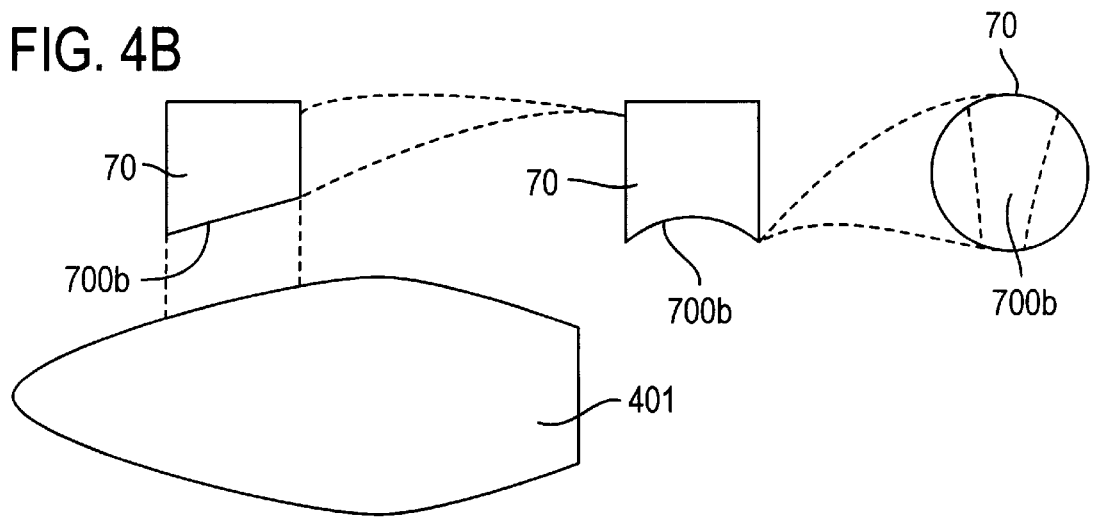
FIG. 4B depicts another configuration of an adapter end for use with the extraction system.
Figure 4C:
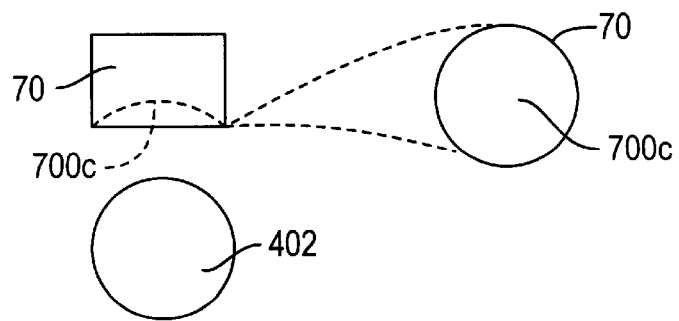
FIG. 4C depicts another configuration of an adapter end for use with the extraction system.

As shown in FIGS. 4A–C, the seal cup adapter 70 can be configured to conform to a variety of container shapes and sizes. In FIG. 4A, the lower surface 700a of the seal cup adapter 70 is machined or otherwise formed to conformably fit against one or more surfaces of a cylindrical container 400. In FIG. 4B, the lower surface 700b of the seal cup adapter 70 is machined or otherwise formed to conformably fit against one or more surfaces of a conical container 401. In FIG. 4C, the lower surface 700c of the seal cup adapter 70 is machined or otherwise formed to conformably fit against one or more surfaces of a spherical container 402. Thus, a variety of seal cup adapters 70 can be kept on hand to ensure accessibility to a wide variety of container shapes and sizes. This is an advantage in that it more easily enables a seal to be formed between the seal cup and the container to be processed.

The seal formed between the container surface and seal cup may be implemented using one or more of o-ring seals, gasket material seals or epoxy or other hardening substance seals. O-rings or gaskets may be sealed by simply compressing the extraction tube 11, and hence the seal cup adapter 70, against the container surface. An epoxy glue may be used to attach the cup adapter 70 to the container surface and form a noncompressive seal. Other techniques may be used.

The seal cup adapter 70 may be configured to incorporate a magnet. For example, an annular magnet 720 may assist in capturing metallic cuttings and preventing their introduction into the extraction port 130 and connected processing system. Metallic cuttings may be present when the access assembly is used to drill or otherwise penetrate the container.

Figure 3:
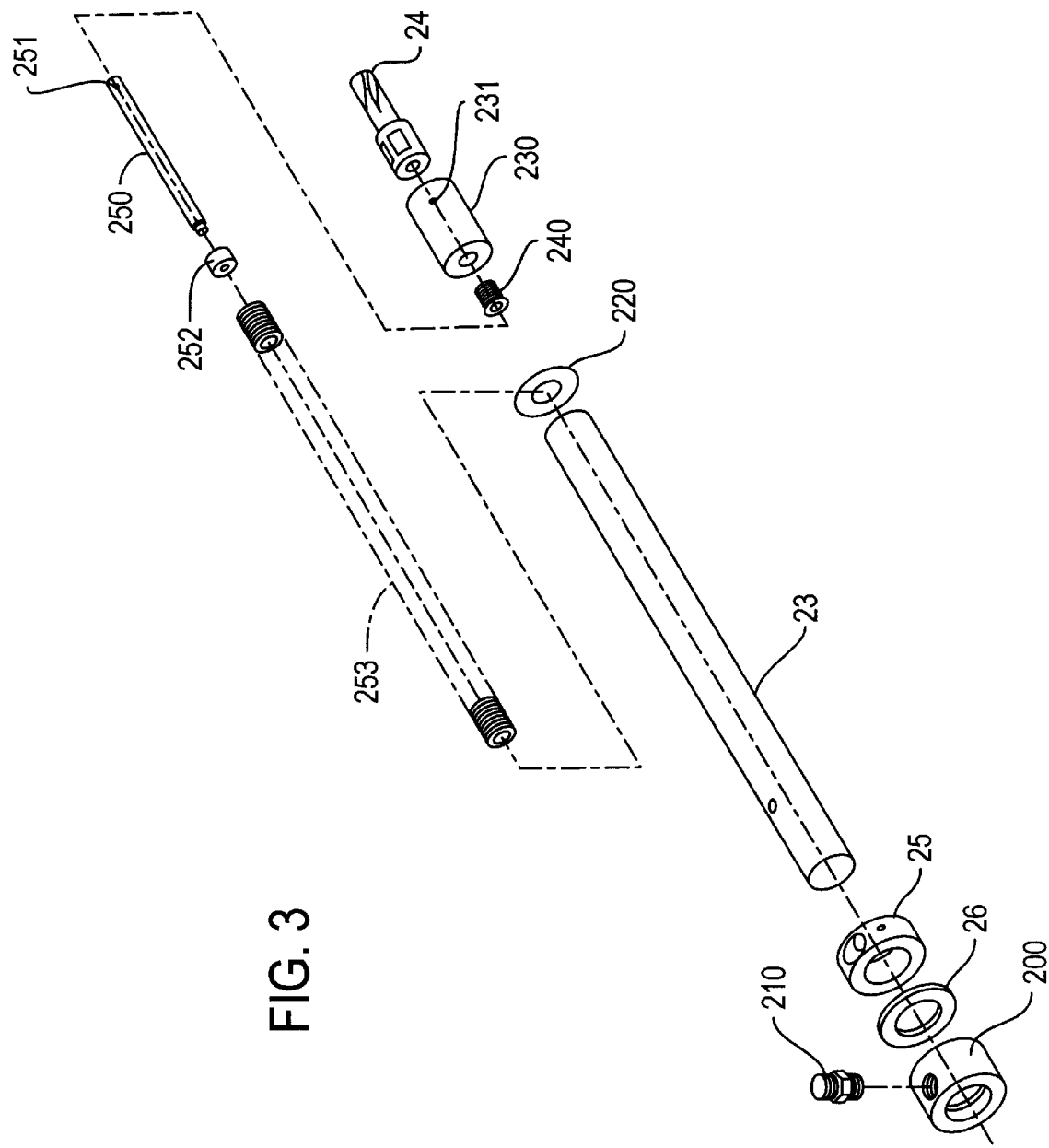
FIG. 3 is an exploded view of a portion of the assembly of FIG. 1.

Details of various aspects of the shaft assembly 23 are shown in FIG. 3. A rotatable union 200 is provided in the shaft assembly 23. The rotatable union 200 is provided with a port 210. The port 210 allows the interior of the shaft assembly 23 to be connected to process piping. For example reagents, solvents, steam or other substances can be fed into the container through port 210. Union 200 is connected with one end of hollow shaft assembly 23 via collar 25 and washer (or other seal) 26.

Another end of shaft assembly 23 is connected with an end of adapter 230 via a threaded nipple 240. Adapter 230 is operably connected with an access tool 24 such as a drill, saw, hole saw, or other cutting tool. The access tool 24 may be secured to the adapter 230 with two sets screws 231. Other attachment schemes may be used.

A screen 220 may be positioned as shown (or elsewhere) to prevent cuttings from entering the annular space between the outer portion of shaft assembly 23 and the extraction tube 11 interior surface. A line filter may be installed in the process piping as an additional precaution to prevent cuttings from entering the process system. Installation of wipers in conjunction with the seals further prevents damage to seals from drill or other cuttings.

The access tool 24 in one embodiment is a hole cutter with a specialized extendible segment 250. This arrangement enables the extendible segment to extend beyond the end of the access tool, within a container that has been accessed within a sealable recovery vessel. This more easily permits cleaning/decontaminating the container within the sealable recovery vessel.

The extendible segment 250 is preferably hollow with one or more orifices 251 at an end thereof to allow the extendible segment 250 to function as a spray shaft to direct material passed therethrough to desired portions of the container. Preferably, the extendible segment 250 is spring loaded via spring 253 and threaded bushing 252. The spring 253 is normally compressed prior to penetration of the container.

Thus the orifice end of shaft 250 does not extend past the end of the access tool 24 when it is pressed against the container. After penetration, the spring extends extendible segment 250 past the end of the access tool 24. This enables the extendible segment to push a "plug" out of the access tool 24 and allows orifice(s) 251 on the extendible segment 250 to extend into the container interior.

Positive stops (e.g., collars) may be used in conjunction with the extraction system 10 and access portion 20 on the support guides 60, for example, to limit the depth of penetration of access portion 20 into the container. One example where this is particularly useful is when the container is a munitions with an internal burster tube structure.

Throughout the unit a variety of seal types are used. Any type of appropriate seal or seal material may be adapted. In one embodiment seals and seal material have been chosen which are optimized for application to chemical warfare materials. Examples of such seal material include neoprene rubber and EPDM rubber. Other seals and seal materials may be used.

In operation, the extraction system 10 and access portion 20 are preferably attached to a sealable recovery vessel. In some embodiments the system comprises both an upper and lower unit to access the container from more than one side. A munition or other container is secured to a carrier and placed inside of the vessel on a support. The carrier allows the container to be properly positioned within the pressure vessel for accessing with the extraction system 10 and access portion 20. The carrier also secures the container and prevents movement during the process.

After the container is securely positioned, the extraction tube 11 is extended to contact the container surface. For embodiments using flexible seals, gaskets, or o-rings, to seal the seal cup adapter 70 to the container wall, the seal cup adapter 70 is urged against the container surface with sufficient pressure to form a seal. In one embodiment, a seal of up to 100 psig with a net compressive force of approximately 200 psig can be used. A compressive force of 200 psig is small enough that an intact, thin walled, soda can (wall thickness of 0.004") is not crushed. (The invention is not however limited to any of these stated pressures.) Thus, an effectively configured seal cup adapter 70 allows a seal to be formed without the use of excessive compression force. This is an advantage, for example, where the container is a munitions, because excessive force may potentially crush an explosively configured munitions.

Container seals may also be formed using epoxies or other hardeners. For this type of seal, the epoxy seal is preferably made prior to inserting the container into the pressure vessel. Seal cup adapters 70 are attached in an appropriate location corresponding to the extraction tube 11 position when the container is located in the pressure vessel. The epoxy seal between the detached seal cup adapter 70 and the container is allowed to harden before inserting the container into the pressure vessel. The container is positioned to align the seal cup adapter 70 with the extraction tube 11. The extraction tube 11 is then extended and mated with the seal cup adapter 70. A seal is obtained between the extraction tube 11 and cup adapter 70 by an o-ring 140 (or gasket or similar device).

After the extraction tube 11 is extended, the integrity of the seals within the extraction system 10 and to the container surface may be tested. This is accomplished by pressurization of the extraction tube 11 interior through the extraction tube access port 130 or the drill assembly access port 210. The ability to maintain a constant pressure is evidence of the integrity of all seals. The pressure may be monitored by gauges or indicators in any conventional fashion known in the art.

After the testing of the seal integrity, the pressure inside the extraction tube 11 can be maintained or relieved prior to drilling. Should a leak be observed, its location can be identified and repaired before proceeding.

The depth to which each cutting tool or bit 24 penetrates can be preestablished by use of the positive drill stops. The stops can be positioned according to information obtained about the configuration of the container. It may be important to limit the depth of penetration due to the presence of interior structures. For example, when the container comprises a munition, the interior can contain explosive burster tubes that the access tool 24 should not contact.

For most operations it is advantageous to use an upper extraction assembly to initially penetrate the container. Use of an upper extraction assembly allows a vapor phase sample to be obtained for positive identification of container contents. After identification, the handling of the hazardous contents can be carried out in a more informed, and hence, safer fashion. A vapor sample can be extracted through the drill assembly port 210 or extraction tube access port 130.

A lower mounted extraction assembly can likewise be used to penetrate the bottom of the container. If desired, a sample may be obtained through one of the access ports. After identification of the sample, handling of hazardous contents can be carried out in a safer manner.

The contents of the container may be drained through the extraction tube 11. For viscous liquids, the draining process may be accelerated by using one of the access ports 130 or 210 to pressurize an extraction tube 11 and, thereby, force the contents out of the container.

Decontamination reagents may be sprayed into the container though the extendible segment 250. Pressurization of the reagent through orifices 251 in the segment while rotating the drill shaft assembly 23 will distribute a cleaning jet around the container interior. The pressurized spray provides a mechanism for removing residuals in addition to any chemical neutralization obtained by the decontamination reagent. Liquid reagents can be withdrawn from the container through a lower extraction tube 11.

Although a detailed description of the preferred embodiments has been provided, the scope of the invention is not limited thereby. Various changes and modifications within the scope of the invention will be readily apparent by those skilled in the art as defined by the appended claims. For example, a remote valve actuator, engageable with a valve of a container could be incorporated into the device to remotely actuate the valve of the container. The remote valve actuator may be hydraulically, electrically or pneumatically powered.

I claim:

1. A sealable recovery vessel system for accessing a container comprising:

a motor;

a tube having a first end and a second end;

said first end of said tube connected to said motor by a union;

an access portion housed within said tube and driven by said motor;

an adapter end connectable to said tube at said second end;

wherein said access portion further comprises an extendible segment extendible from within said access portion.

2. The sealable recovery vessel system of claim 1 wherein said adapter end comprises a face adapted to sealingly mate with at least one surface of a container.

3. The sealable recovery vessel of claim 2, wherein said adapter end face comprises a substantially concave surface.

4. The sealable recovery vessel of claim 2, wherein said adapter end face is adaptable to conformably fit against a substantially cylindrical surface.

5. The sealable recovery vessel of claim 2, wherein said adapter end face is adaptable to conformably fit against a substantially conical surface.

6. The sealable recovery vessel of claim 2, wherein said adapter end face is adaptable to conformably fit against a substantially spherical surface.

7. The sealable recovery vessel of claim 2, wherein said adapter end face is adaptable to conformably fit against a substantially flat surface.

8. The sealable recovery vessel of claim 2, wherein said adapter end face is adaptable to conformably fit against a gas cylinder.

9. The sealable recovery vessel of claim 2, wherein said adapter end face is adaptable to conformably fit against a munition.

10. The sealable recovery vessel of claim 2, wherein said adapter end face is adaptable to conformably fit against a substantially drum shaped container.

11. The sealable recovery vessel system of claim 3 wherein said extendible segment further comprises orifices capable of spraying a fluid therefrom.

12. The sealable recovery vessel system of claim 3 wherein said union comprises a non-rotating portion coupled to said tube and a rotating portion coupled to said motor;

said non-rotating portion further comprising a tube access port.

13. The sealable recovery vessel system of claim 12 wherein said tube access port is configured to permit substances to be introduced or removed to or from said tube.

* * * * *